(12) United States Patent
Cueto

(10) Patent No.: US 11,204,687 B2
(45) Date of Patent: *Dec. 21, 2021

(54) VISUAL THUMBNAIL, SCRUBBER FOR DIGITAL CONTENT

(71) Applicant: Barnes & Noble College Booksellers, LLC, Basking Ridge, NJ (US)

(72) Inventor: Gerald B. Cueto, San Jose, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,550

(22) Filed: Apr. 10, 2020

(65) Prior Publication Data

US 2020/0241715 A1 Jul. 30, 2020

Related U.S. Application Data

(63) Continuation of application No. 14/134,093, filed on Dec. 19, 2013, now Pat. No. 10,620,796.

(51) Int. Cl.
*G06F 3/0483* (2013.01)
*G06F 3/0485* (2013.01)
*G06F 3/0488* (2013.01)

(52) U.S. Cl.
CPC .......... *G06F 3/0483* (2013.01); *G06F 3/0485* (2013.01); *G06F 3/0488* (2013.01)

(58) Field of Classification Search
CPC ............... G06F 3/0483; G06F 3/04883; G06F 15/0291; G06F 17/21; G06F 3/0488;
(Continued)

(56) References Cited

U.S. PATENT DOCUMENTS 4,896,543 A 1/1990 Gullman
5,633,471 A 5/1997 Fukushima
(Continued)

FOREIGN PATENT DOCUMENTS

EP 0722150 7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; printed from the Internet on Jun. 20, 2013, 6 pages.
(Continued)

*Primary Examiner* — Wilson W Tsui
(74) *Attorney, Agent, or Firm* — Finch & Maloney PLLC

(57) ABSTRACT

Techniques are disclosed for providing a thumbnail scrubber mode in electronic devices, such as a touch screen device. In an embodiment, a thumbnail scrubber may be displayed to the user in response to a distinguishable touch screen gesture, or in response to a toolbar command. A toolbar may be displayed on the device including a scrubber bar, and the thumbnail scrubber mode may be invoked when a user interacts with the scrubber bar. The thumbnail scrubber displays multiple thumbnail images of pages of digital content and allows the user to preview and scroll through the digital content while continuing to display the current page in the main viewer of the device. After scrubbing through the digital content pages, the user may select one of the thumbnail images in the scrubber in order to access that page of the digital content.

20 Claims, 10 Drawing Sheets

(58) Field of Classification Search
CPC ....... G06F 2203/04803; G06F 3/04842; G06F 3/0485; G06F 3/04817; G06F 3/04847; G06F 3/04855
See application file for complete search history.

(56) References Cited

U.S. PATENT DOCUMENTS

| | | | |
|---|---|---|---|
| 5,844,557 A | 12/1998 | Shively, II | |
| 5,874,961 A | 2/1999 | Bates et al. | |
| 6,259,438 B1 | 7/2001 | Fleck et al. | |
| 6,334,157 B1 | 12/2001 | Oppermann et al. | |
| 6,956,564 B1 | 10/2005 | Williams | |
| 7,603,618 B2 * | 10/2009 | Mori | G06F 40/103 715/229 |
| 7,649,524 B2 | 1/2010 | Haim et al. | |
| 7,810,912 B2 | 10/2010 | Ozawa | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| 8,341,543 B2 * | 12/2012 | Shah | 715/784 |
| RE44,103 E | 3/2013 | Williams | |
| 8,400,417 B2 | 3/2013 | Ording et al. | |
| 8,508,494 B2 | 8/2013 | Moore | |
| 8,564,544 B2 * | 10/2013 | Jobs | G06F 3/04886 345/173 |
| 8,793,575 B1 | 7/2014 | Lattyak et al. | |
| 8,812,977 B2 | 8/2014 | Naderi | |
| 8,977,892 B2 * | 3/2015 | Kobayashi | G11B 5/09 714/6.22 |
| 8,977,982 B1 * | 3/2015 | Amacker | G06F 3/014 715/787 |
| 8,990,861 B2 | 3/2015 | Nishikawa et al. | |
| 9,158,741 B1 * | 10/2015 | Hansen | G06F 3/0488 |
| 9,158,765 B1 | 10/2015 | Story, Jr. et al. | |
| 9,367,227 B1 * | 6/2016 | Kim | G06F 3/0488 |
| 9,645,724 B2 | 5/2017 | Matas | |
| 9,715,482 B1 * | 7/2017 | Bjorkegren | G06F 40/103 |
| 2001/0025289 A1 | 9/2001 | Jenkins et al. | |
| 2002/0091739 A1 | 7/2002 | Ferlitsch et al. | |
| 2002/0116421 A1 | 8/2002 | Fox et al. | |
| 2004/0194033 A1 | 9/2004 | Holzwarth et al. | |
| 2004/0205504 A1 | 10/2004 | Phillips | |
| 2005/0193330 A1 | 9/2005 | Peters | |
| 2006/0059436 A1 | 3/2006 | Nurmi | |
| 2006/0279559 A1 | 12/2006 | Kongqiao et al. | |
| 2007/0047002 A1 | 3/2007 | Hull et al. | |
| 2008/0036747 A1 | 2/2008 | Hope | |
| 2009/0058822 A1 | 3/2009 | Chaudhri | |
| 2010/0037140 A1 | 2/2010 | Penner et al. | |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0154260 A1 * | 6/2011 | Wang | G06F 3/04883 715/823 |
| 2011/0258542 A1 | 10/2011 | Kenney et al. | |
| 2011/0296344 A1 | 12/2011 | Habib et al. | |
| 2012/0042246 A1 | 2/2012 | Schwesinger et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0162115 A1 | 6/2012 | Lim | |
| 2012/0192118 A1 * | 7/2012 | Migos | G06F 3/04883 715/863 |
| 2012/0221938 A1 | 8/2012 | Patterson et al. | |
| 2012/0235901 A1 | 9/2012 | Binder | |
| 2012/0240074 A1 | 9/2012 | Migos et al. | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | Van Der Raadt | |
| 2013/0016045 A1 | 1/2013 | Zhao et al. | |
| 2013/0036383 A1 | 2/2013 | Yuan et al. | |
| 2013/0055140 A1 * | 2/2013 | Mosquera | G06F 3/0483 715/776 |
| 2013/0061134 A1 | 3/2013 | Maehira | |
| 2013/0063364 A1 | 3/2013 | Moore | |
| 2013/0073932 A1 | 3/2013 | Migos et al. | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0198677 A1 | 8/2013 | Dash | |
| 2013/0205244 A1 * | 8/2013 | Decker | G06F 3/04845 |
| 2013/0222274 A1 | 8/2013 | Mori et al. | |
| 2014/0053066 A1 | 2/2014 | Imamura | |
| 2014/0095608 A1 | 4/2014 | Mandalia et al. | |
| 2014/0109012 A1 * | 4/2014 | Choudhary | G06F 3/0483 715/838 |
| 2014/0195961 A1 * | 7/2014 | Shoemaker | G06F 3/0483 715/776 |
| 2015/0153910 A1 | 6/2015 | Wheeler et al. | |

OTHER PUBLICATIONS

Volpe, Joseph, Amazon patents intelligent pen for adding annotations to digital and printed media (updated), http://www.engadget.com/2012/03/06/amazon-patents-intelligent-pen/, posted Mar. 6, 2012 at 5:39 PM, 3 pages.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, published Feb. 28, 2013, 13 pages.

"Bamboo Stylus," Wacom Americas, http://www.wacom.com/en/products/stylus, printed from the Internet on Jun. 20, 2013, 5 pages.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, printed from the Internet on Aug. 2, 2013, 1 page.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9/10/04, 10 pages.

"Pen," DuoSense Pen, N-trig Hands-on computing, http://www.n-trig.com/Content.aspx?Page=DigitalPencil, printed from the Internet on Jun. 20, 2013, 3 pages.

"Easing functions," Easing Functions Cheat Sheet, http://easings.net/, printed from the Internet on Jun. 17, 2013, 3 pages.

Kirupa, Easing Functions (aka Timing Functions) in CSS3, http://www.kirupa.com/html5/easing_functions_css3.htm, published Apr. 3, 2013, 16 pages.

"EMR (Electro-Magnetic Resonance) Technology—The De Facto Standard for Pen Tablet Devices is Realized using EMR Technology," Wacom Components : Input Technology: EMR Technology, http://wacom-components.com/english/technology/emr.html, printed from the Internet on Aug. 2, 2013, 5 pages.

"Simultaneous Pen & Touch: The Natural Way to Work," Perceptive Pixel Active Stylus, www.perceptivepixel.com/_literature_136086/Active_Stylus, printed from the Internet on Dec. 14, 2012, 2 pages.

"Future Apple Notebooks & Tablets may use Acoustic Commands—Patently Apple," http://www.patentlyapple.com/patently-apple/2011/

(56) References Cited

OTHER PUBLICATIONS

02/future-apple-notebooks-tablets-may-use-acoustic-commands. html, published Feb. 18, 2011, 6 pages.
"Guidelines for selecting text and images (Windows Store apps)," http://msdn.microsoft.com/en-us/library/windows/apps/hh465334, printed from the Internet on Jun. 20, 2013, 5 pages.
Lutz, Zachary, "Hands-on with wireless, ultrasonic stylus an touchless gestures at MWC (video)," http://www.engadget.com/2012/03/01/hands-on-with-wireless-ultrasonic-stylus-and-touchless-gestures/, posted Mar. 1, 2012 at 8:28 AM, 3 pages.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, printed from the Internet on Jun. 20, 2013, 6 pages.
"How do WACOM tablets work?," tablet4u.co.uk, http://www.tablet4u.co.uk/techinfo.html, printed from the Internet on Jun. 20, 2013, 2 pages.
Kim, Arnold, "Multi-Touch Page Flipping eBook Concept Shown on an iPad," http://www.macrumors.com/2012/01/23/multi-touch-page-flipping-ebook-concept-shown-on-an-ipad/, posted Jan. 22, 2012 at 10:52 PM, 6 pages.
"Desktop Touchscreens,"—Desktop touchscreens explained, http://www.touchscreenmagazine.nl/touchscreen-solutions/desktop-touchscreens, printed from the Internet on Nov. 3, 2012, 1 page.
"MTStylus Wireless Stereo Stylus for iPhone/Andriod Phone & Tablet," dexim—MTStylus Wireless Stereo Stylus, http://www.dexim.net/content.php?id=165&pid=11, printed from the Internet on Jun. 20, 2013, 2 pages.
"Padblue 2," BRANDO—mobile.brando.com, http://mobile.brando.com/Padblue-2_p9162c1577d94.html., printed from the Internet on May 10, 2013, 4 pages.
Fingas, Jon, "Panasonic mobile devices to use Anoto's pattern-based pen input technology," http://www.engadget.com/2013/01/08/panasonic-mobile-devices-to-use-anoto-pattern-pen-input/, posted Jan. 8, 2013 at 1:00 PM, 4 pages.
"Bluetooth 4.0 SmartPen The future just got a little brighter," Pogo Connect, http://tenonedesign.com/connect.php, printed from the Internet on Jun. 20, 2013, 7 pages.
Quick, Darren, "Pressure sensitive technology set to bring 3D capability to touchscreens," Mobile Technology, http://www.gizmag.com/new-touchscreen-technology, published on Jan. 31, 2010, 4 pages.
Rigg, Jamie, "Sony tries to patent stylus with friction-based haptic feedback," http://www.engadget.com/2012/11/22/sony-haptic-feedback-stylus-patent/, posted on Nov. 22, 2012 at 9:50 AM, 2 pages.
"Stylus Hanging Bluetooth Headset," BRANDO—mobile.brando.com, http://mobile.brando.com/prod_detail.php?prod_id=03291, printed from the Internet on May 10, 2013, 4 pages.
"The JukeStyle is a great budget stylus for your iOS devices," stylus Archives—iPad News, http://www.ipadnews.nl/tag/stylus/, printed from the Internet on Jun. 20, 2013, 44 pages.
Lavrinc, Damon, "Why Flipping Through Paper-Like Pages Endures in the Digital World," Gadget Lab, http://www.wired.com/gadgetlab/2012/05/why-flipping-through-paper-like-pages-endures-in-the-digital-world/, posted on May 11, 2012 at 3:48 PM, 5 pages.
Bragdon, et al., "Experimental Analysis of Touch-Screen Gesture Designs in Mobile Environments", CHI 2011—Session: Gestures, May 7-12, 2011, Vancouver, BC, Canada. Copyright 2011 ACM 978-1-4503-0267-8/11/05, pp. 403-412.
"Gesture Search for Google Mobile", Google Mobile, www.google.com/mobile/gesture-search, printed from the Internet on Dec. 26, 2012, 1 page.
"Comics by comiXology," Comic Book Reader Guide, http://www.comicbookreaderguide.com/comics-by-comixology/, printed from the Internet on May 6, 2013, 24 pages.
"NFC Forum: Frequently Asked Questions," http://www.nfc-forum.org/resources/faqs#acknowledge, printed from the Internet on Feb. 18, 2013, 11 pages.
"How to Remote Wipe an iPhone or iPad," OSXDaily, http://osxdaily.com/2012/06/05/remote-wipe-iphone-or-ipad/, published Jun. 5, 2012, 4 pages.
"Screen hotspot," Wikipedia, the free encyclopedia, http://en.wikipedia.org/wiki/Screen_hotspot, printed from the Internet on May 15, 2013, 1 page.
"PAiA—Touch Switches," copyright 2006 PAiA Corporation USA, http://www.paia.com/ProdArticles/touchsw.html, printed from the Internet on Aug. 27, 2013, 3 pages.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=1439369, posted Jan. 11, 2012, 8:20 AM, 1 page.
"Navigation Drawer," http://developer.android.com/design/patterns/navigation-drawer.html, downloaded from the Internet on Dec. 20, 2013, 14 pages.
"Notebook Menu Bar" by SMART Technologies ULC eLearning, archived by Internet Wayback Machine on Nov. 30, 2013 downloaded Jun. 13, 2016 from https://web.archive.org/web/20131130163207/http://www.education.uiowa.edu/docs/default-source/etc-docs/notebook/reference.pdf?sfvsn=2.
"PowerPoint 2010 Sections" by Simon Williams, Nov. 5, 2012 downloaded Jun. 26, 2016 from http://www.itproportal.com/2012/05/11/powerpoint-2010-sections/.

* cited by examiner

VISUAL THUMBNAIL, SCRUBBER FOR DIGITAL CONTENT

REFERENCE TO PRIOR APPLICATION

This application is a continuation of U.S. patent application Ser. No. 14/134,093 (filed Dec. 19, 2013), the entire disclosure of which is hereby incorporated by reference herein.

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, one or more eBooks, images, video or music files, document files, an online article or blog, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figure 1A:
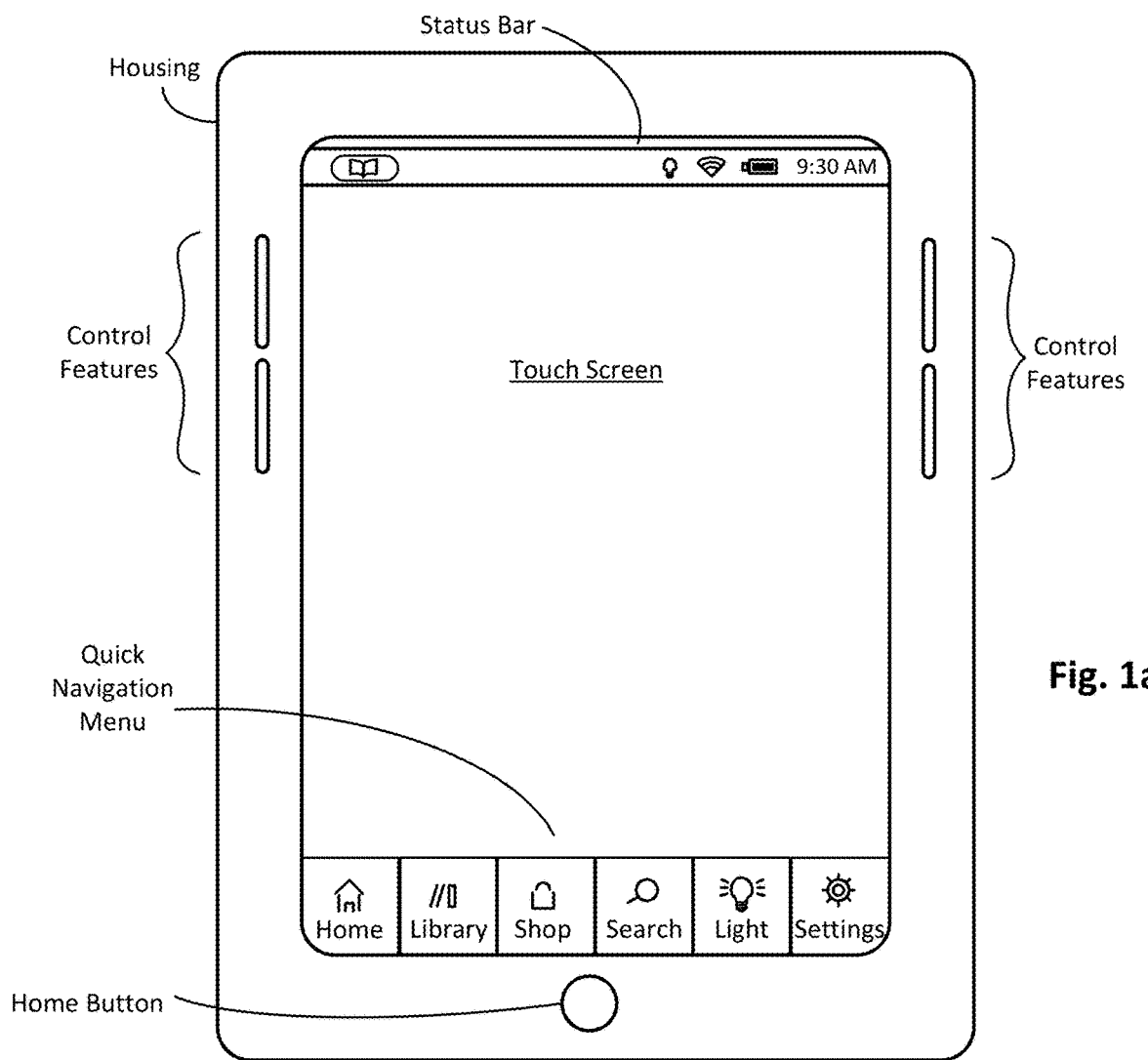
FIGS. 1a-b illustrate an example electronic touch screen device having a thumbnail scrubber mode configured in accordance with an embodiment of the present invention.

Techniques are disclosed for providing a thumbnail scrubber mode in electronic computing devices, such as a touch screen device. In one embodiment, a thumbnail scrubber may be displayed to the user in response to a distinguishable touch screen gesture, or in response to a toolbar command. A toolbar, including a scrubber bar, may be displayed on the device and the thumbnail scrubber mode may be invoked when a user interacts with the scrubber bar. Once invoked, the thumbnail scrubber mode may display multiple thumbnail images of pages of digital content and allows the user to preview and scroll through the thumbnail images while continuing to display the current page in the main viewer of the device. A marker or other indicator may be placed along the scrubber bar so that the user may keep track of the location of the currently displayed page, in some embodiments. The thumbnails may include page numbers and/or bookmarks, in some examples. Between chapter or section breaks, a greater space may be left between the thumbnails and a section break marker may also be placed between thumbnails so that the user may easily identify such section breaks. A chapter or section bar may also be displayed to indicate the chapter or section of the content being previewed in the thumbnail scrubber. After scrubbing through the thumbnail images, the user may select one of the thumbnails in the scrubber in order to access that page of the digital content in the main viewer.

General Overview

As previously explained, electronic display devices such as tablets, eReaders, and smart phones are commonly used for displaying user interfaces and consumable content. The user of such devices can typically consume and navigate the displayed content with relative ease. In some instances, the user may wish to preview following or previous pages of the digital content while continuing to display the current page in the main device viewer. While general functions suitable for previewing and/or scrolling through digital content may be available in some electronic devices, a thumbnail scrubber mode as described herein may provide a more intuitive or otherwise positive user experience Thus, and in accordance with an embodiment of the present invention, thumbnail scrubbing techniques are disclosed for use in electronic touch screen devices. In some embodiments, the user may invoke a thumbnail scrubber mode by performing an activation gesture over a touch screen display or by selecting a thumbnail scrubbing option or thumbnail scrubbing feature from an options menu or toolbar. Once invoked, the thumbnail scrubber mode may display a number of thumbnail images representing different pages of digital content, and the user may be able to preview content not currently displayed on the main viewer of the device. The thumbnail images may appear to be in the foreground with the content displayed in the main viewer appearing in the background. The user may navigate through the digital content by performing various navigation gestures, and selecting one of the thumbnail images will update the main viewer to show the particular page of digital content associated with that thumbnail image, in some embodiments. The user may exit the thumbnail scrubber mode by, for example, selecting a thumbnail image, tapping or performing any gesture away from the touch screen display, or waiting a period of time (e.g., five or six seconds) without providing any user input.

In one example, the user may access the thumbnail scrubber through a toolbar. In such an example, one or more toolbars may be accessed by tapping or swiping upward on any area of the page where the underlying user interface is not programmed to react to a tap or upward swipe gesture. In some embodiments, a tap, swipe, or other toolbar invocation gesture may be performed in the page margin or in a blank space on the main viewer. The user may also swipe up from the bottom bezel of the screen to bring up one or more toolbars. In some embodiments, in response to such a toolbar invocation gesture the device may display an upper and lower toolbar that may slide into view from the top and bottom margins respectively. In one example, the top toolbar includes descriptive or bibliographic data about the digital content, while the top edge of the bottom toolbar includes a scrubber bar with a scrubber knob indicating the current page position. The scrubber bar may include, in some embodiments, dots or hash marks indicating chapter breaks, section breaks, bookmarks, or other content divisions. In some cases, to dismiss the toolbars the user can tap or perform any gesture anywhere away from the top or bottom toolbars. In such an example, instead of creating a note, highlighting content, or performing some other function on the digital content, a gesture over the content while the toolbars are displayed simply dismisses the toolbars. In some embodiments, a thumbnail scrubber may be displayed along with the upper or lower toolbar, while in other embodiments the thumbnail scrubber is only displayed after contacting the scrubber bar or scrubber knob.

In one particular example, the thumbnail scrubber may slide up from the bottom toolbar when an on-press is detected at the scrubber knob or scrubber bar. In another embodiment, when the thumbnail scrubber is displayed on the device, any toolbar not associated with the thumbnail scrubber mode (e.g., an upper toolbar displaying bibliographic information) may disappear from the device screen. In one such example, the upper toolbar may slide out of view into the upper margin of the device screen once the thumbnail scrubber mode is invoked. In one particular embodiment, the thumbnail scrubber and chapter bar slide away if the scrubber knob is tapped while the thumbnail scrubber is up. In some embodiments, the thumbnails may include page numbers, song titles, or some other content identifier. Once the thumbnail scrubber is displayed in the foreground, with the main viewer of the device showing the current page in the background, the thumbnail image for the current page may appear highlighted with a specific color, shaded, or otherwise altered in appearance so that the user knows that particular thumbnail is associated with the content currently displayed in the main viewer of the device, in some embodiments. When scrubbing past a content division, such as a chapter break, section break, new album, or some other division of digital content, a new chapter or section name may slide in on the chapter bar until it virtually pushes the current one out of view, in some embodiments. In some embodiments, the thumbnails may be grouped by chapter and thumbnails adjacent to a chapter break may be separated in the scrubber view by a section break indicator (e.g., a wider gap, hash mark, dashed line, dotted line, or other section break symbol).

The user may scrub through the thumbnail images and preview various sections of the digital content by performing, for example, a press-and-drag gesture on the scrubber knob of a scrubber bar. In one example, the thumbnail images scroll the opposite direction to the movement of the scrubber knob. For example, if the user drags the scrubber knob to the right, subsequent pages of the digital content will be previewed by scrolling the thumbnail images to the left. Once the user moves the scrubber knob away from the location of the current page, a dash, hash mark, or other visible mark may be placed on the scrubber bar indicating the location of the current page (i.e., the one still displayed on the main viewer of the device), in some embodiments. In some embodiments, the user may swipe over the thumbnail images themselves, rather than the scrubber bar, in order to scroll through the thumbnail images. When either end is reached, a haptic bounce animation may be shown indicating that the user has reached the beginning or the end of the digital content. In still other embodiments, the thumbnail scrubber may include a chapter or section bar located above or below the thumbnail images and indicating the chapter or section of the content being previewed in the thumbnail scrubber. In one such embodiment, the user may swipe over the chapter bar (or section bar in the case of digital content divided into sections instead of chapters) in order to preview thumbnail images related to the next or previous chapter, depending on the direction of the swipe gesture. In such an example, the chapter title displayed in the chapter bar may be pushed out of view as a next or previous chapter title moves into position in response to a swipe gesture. Once the new chapter title is displayed in the chapter bar, thumbnail images for the first several pages of the newly displayed chapter may be shown in the thumbnail scrubber.

Releasing contact from a scrubber knob or completing a swipe gesture over the thumbnail images or chapter bar does not necessarily change the page displayed on the main viewer of the device. For instance, in some cases the user must tap on the thumbnail image in order to access a new page of content in the main viewer. In other embodiments, the user may tap the chapter bar to access the first page of that chapter or section in the main viewer. After tapping the desired thumbnail or chapter, the correct page is accessed on the device and the scrubber and toolbars slide away, thus exiting the thumbnail scrubber mode, in some embodiments. In other embodiments, the correct page is displayed in the main device viewer and the scrubber and toolbar remains visible until the user taps an area of the screen away from the toolbars and scrubber or until a specified period of time passes (e.g., five or six seconds) without any user input.

Depending on the font size and/or zoom level of the digital content being consumed, a single thumbnail can represent multiple pages of content, or multiple thumbnails may be used to represent a single page of content, in some embodiments. For example, this might occur if the main viewer of the device shows multiple pages worth of content, or when the device is in a landscape orientation in which a spread of two pages is displayed at once. In such examples, a single thumbnail may display two or more pages of digital content and the thumbnail may include a page span instead of a single page number. Conversely, a page of content may span more than one screenshot of the main viewer in some embodiments, in which case multiple thumbnails may be outlined or otherwise grouped together in the thumbnail scrubber. In such an example, a group of multiple thumbnail images may share a single page number. In some such embodiments, the thumbnail for the current content displayed on the main viewer may be highlighted, shaded, or otherwise altered in appearance so that the user may distinguish which thumbnail is associated with the content currently displayed on the main device viewer.

As used herein, a swipe gesture may include a sweeping or dragging gesture across at least a portion of the touch sensitive surface; whether directly contacting that surface or hovering over that surface (e.g., within a few centimeters or otherwise close enough to be detected by the touch sensitive surface). In some embodiments, the swipe gesture may be performed at a constant speed in one single direction, while in other embodiments the swipe gesture may follow a curved path or otherwise non-straight path. The gestures can be performed, for example, with the tip of a finger or a stylus, or any other suitable implement capable of providing a detectable swipe gesture. Given the global nature and/or uniqueness of the engagement mechanism, in accordance with some example embodiments, the thumbnail scrubber techniques described herein can be similarly enabled within multiple diverse applications (e.g., document viewer, photo viewer, eReader, etc.) and without conflicting with other global gestures that might also be used by the device's operating system. Various types of digital content can benefit from the thumbnail scrubber described herein. For example, the digital content may include a digital catalogue, magazine, comics, eBook, text document, slide show, photos, music files, and/or other digital content that may be accessed and navigated through using the UI of a digital computing device.

Architecture

Figure 1B:
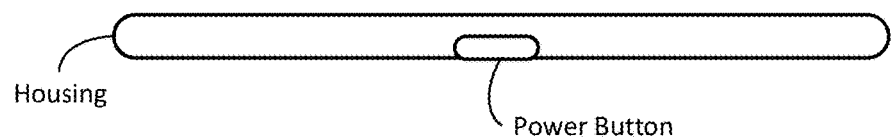

FIGS. 1a-b illustrate an example electronic touch sensitive device having a thumbnail scrubber mode configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device (e.g., the thumbnail scrubber mode), or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
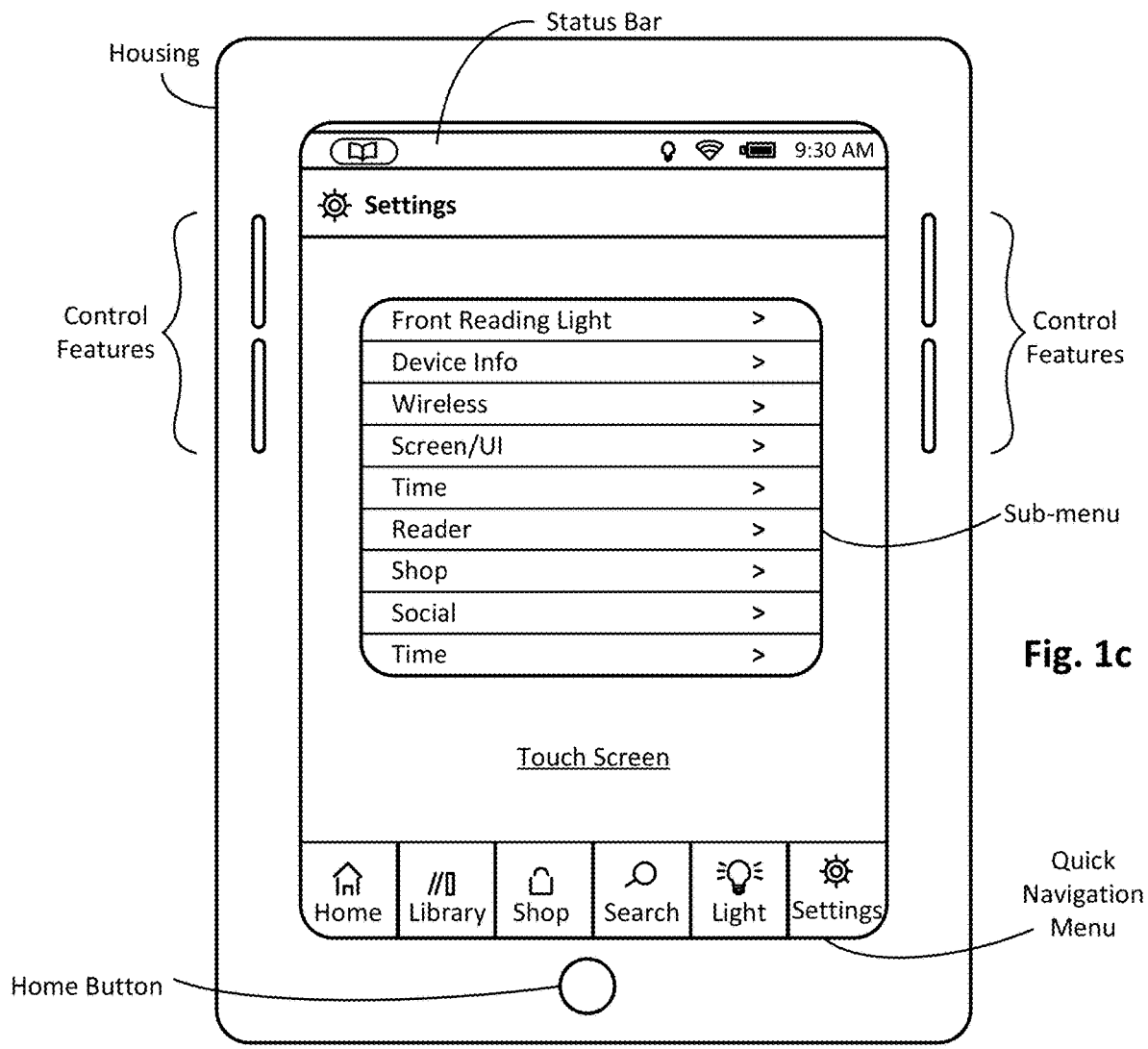
FIGS. 1c-d illustrate example configuration screen shots of the user interface of the electronic touch screen device shown in FIGS. 1a-b, configured in accordance with an embodiment of the present invention.
Figure 1D:
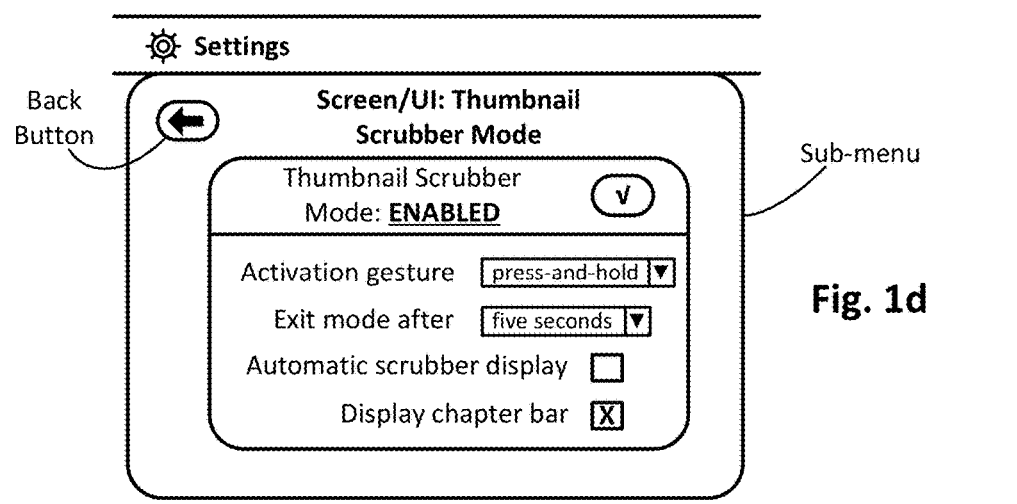

In one particular embodiment, a thumbnail scrubber mode configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu option may cause the configuration sub-menu of FIG. 1d to be displayed, in accordance with an embodiment. In other example embodiments, selecting the Screen/UI option may present the user with a number of additional sub-options, one of which may include a so-called "thumbnail scrubber mode" option, which may then be selected by the user so as to cause the thumbnail scrubber mode configuration sub-menu of FIG. 1d to be displayed. Any number of such menu schemes and nested hierarchies can be used, as will be appreciated in light of this disclosure. In other example embodiments, the thumbnail scrubber mode is hard-coded such that no configuration sub-menus are needed or otherwise provided (e.g., scrubbing through digital content as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the thumbnail scrubber mode configuration sub-menu shown in FIG. 1d can be provided to the user, in accordance with one such example embodiment. The user can configure a number of features with respect to the thumbnail scrubber mode, in this example case. For instance, the configuration sub-menu includes a UI check box that when checked or otherwise selected by the user, effectively enables the thumbnail scrubber mode (shown in the enabled state); unchecking the box disables the function. Other embodiments may have the thumbnail scrubber mode always enabled or enabled by a physical switch or button located on the device, for example.

In some embodiments, the thumbnail scrubber mode may be associated with, among other things, an activation gesture and/or an exit time period. For example, instead of accessing the thumbnail scrubber mode via a toolbar, the user may wish to invoke the thumbnail scrubber mode automatically using a specific touch screen gesture. In this particular example, the user has selected a press-and-hold gesture performed over a page of digital content to activate the thumbnail scrubber mode. As will be appreciated, any distinguishable user input may be configured to invoke the thumbnail scrubber mode, and in the specific example described it may still be possible for the user to access the thumbnail scrubber mode via a toolbar. Once the thumbnail activation mode has been invoked, the mode may exit if the user fails to interact with the scrubber and/or toolbar, in some embodiments. As can be seen in this example, the user has selected to exit the thumbnail scrubber mode if the user fails to provide any user input for five seconds. In still other embodiments, note that a touch screen gesture is not necessarily required. For instance, in a desktop computing application having a non-touch display and a mouse, the so-called gestures may be performed by the user dragging a cursor (e.g., via a click-and-hold mouse-based drag) using a keyboard, mouse, or other suitable input mechanism. In a more general sense, any suitable user input techniques can be used to interact with the thumbnail scrubber mode provided herein. For ease of description, examples provided herein focus on touch screen technologies.

With further reference to the example embodiment of FIG. 1d, the user has the option to enable automatic display of the thumbnail scrubber, such that the thumbnail scrubber mode is automatically invoked when one or more toolbars are displayed. The user may further enable the chapter bar to be displayed along with the thumbnail image scrubber, in some embodiments. As can be seen in this example, a touch screen UI check box has been used to enable the chapter bar option. As can be seen in this example, the various features of the thumbnail scrubber mode have been selected or enabled using UI check boxes and drop-down menus; however, any suitable UI selection mechanism can be used. As mentioned above, many other gestures and/or features may be configured or edited with respect to the thumbnail scrubber mode, and this example figure is not intended to limit the disclosure to any particular type of gestures and/or features.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an example of how a thumbnail scrubber mode may be configured by the user, and numerous other configurable or hard-codable aspects will be apparent in light of this disclosure. Note that in some embodiments the thumbnail scrubber mode may be visually and/or aurally demonstrated or otherwise confirmed to the user via animations and/or sound effects. Such animations and sound effects may be used to provide clarity to the function being performed or otherwise enhance the user experience. In some embodiments, such animations and sound effects may be user-configurable, while in other embodiments they are hard-coded.

Figure 2A:
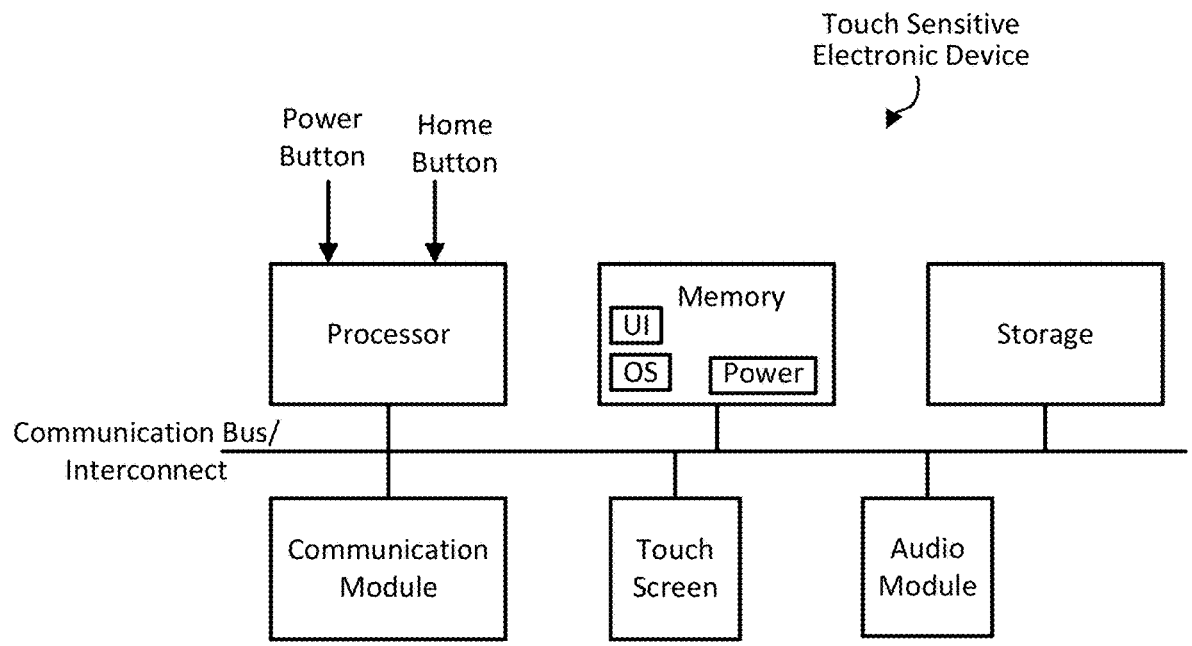
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). The touch screen and underlying circuitry is capable of translating a user's contact (direct or proximate) with the touch screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a UI having a thumbnail scrubber mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11 b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc.). The device may be smaller, for example, for smartphone and tablet applications and larger for smart computer monitor and laptop and desktop computer applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The UI module can be, for example, based on touchscreen technology and the various example screen shots and use-case scenarios shown in FIGS. 1a, 1c-d, 3a-d, 4a-b, 5a-d, and 6a-b, and in conjunction with the thumbnail scrubber methodologies demonstrated in FIG. 7, which will be discussed in turn. The audio module can be configured to speak or otherwise aurally present, for example, a digital content sample, a selected eBook, or other textual content, and/or to provide verbal and/or other sound-based cues and prompts to guide the thumbnail scrubber mode, as will be appreciated in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
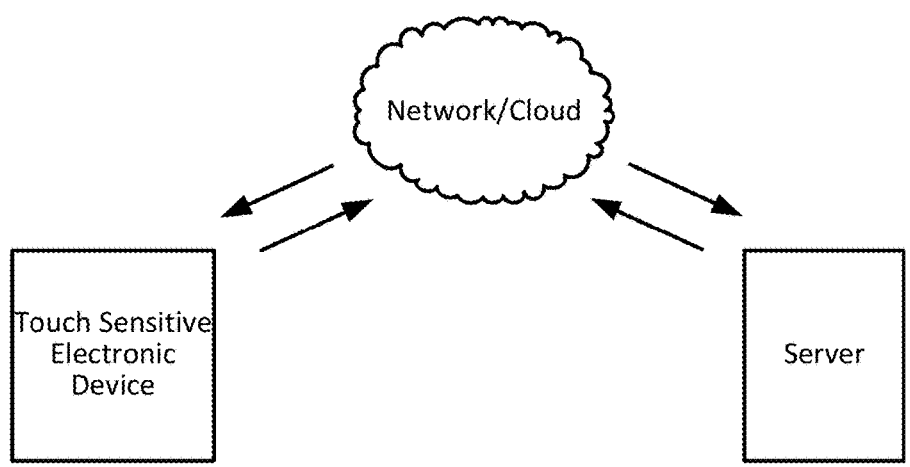
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a thumbnail scrubber mode as provided herein to the touch screen device (e.g., via JavaScript or other browser based technology). In other embodiments, portions of the thumbnail scrubber methodology can be executed on the server and other portions of the methodology can be executed on the device. Numerous server-side/client-side execution schemes can be implemented to facilitate a thumbnail scrubber mode in accordance with an embodiment, as will be apparent in light of this disclosure.

Thumbnail Scrubber Mode Examples

Figure 3A:
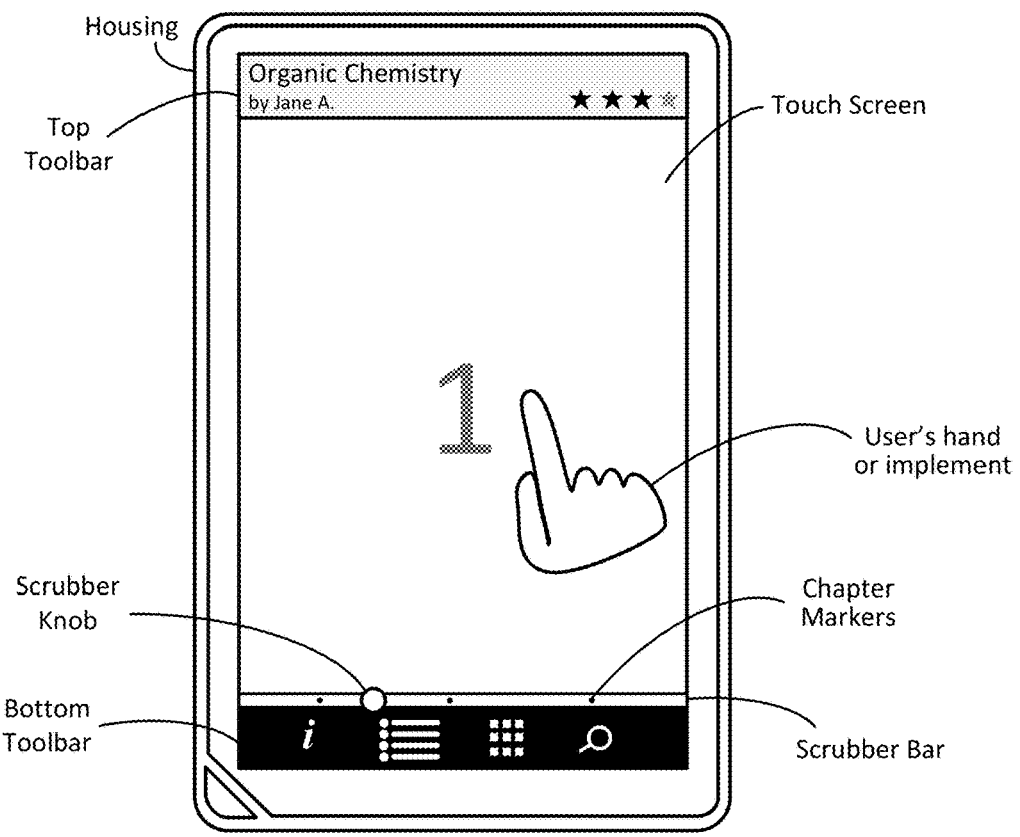
FIGS. 3a-d illustrate an example thumbnail scrubber mode of an electronic touch screen device, in accordance with an embodiment of the present invention.

FIGS. 3a-e collectively illustrate an example thumbnail scrubber mode that can be applied to a touch sensitive display of an electronic device, in accordance with an embodiment of the present invention. As can be seen in FIG. 3a, the device housing surrounds the touch screen of the device, and the device is displaying an eBook page labeled page 1. The user can interact with the touch screen with fingers or any other suitable implement, and in this particular example, performing a quick tap gesture (e.g., lasting less than one second) on the touch screen device bringing up a top toolbar and a bottom toolbar. In some embodiments, the user may return to viewing only the page of digital content by tapping an area of the screen away from the toolbars, or waiting a specified period of time (e.g., five or six seconds)

without selecting a toolbar option. The top toolbar, in this example, displays the book title, author name, and rating, while other embodiments may display fewer or additional descriptive and/or bibliographic data or no top toolbar at all. As can be further seen with reference to FIG. 3a, the bottom toolbar contains a number of icons, including an "i" which may display information regarding the content displayed on the device, a table of contents icon, a visual table of contents icon shown as a grid of tiles, a search icon that appears as a magnifying glass, and a scrubber bar including a scrubber knob and chapter markers. The chapter markers may display the location of chapter breaks in the eBook, while the scrubber knob may show the user's current progress through the digital content, in some embodiments.

Figure 3B:
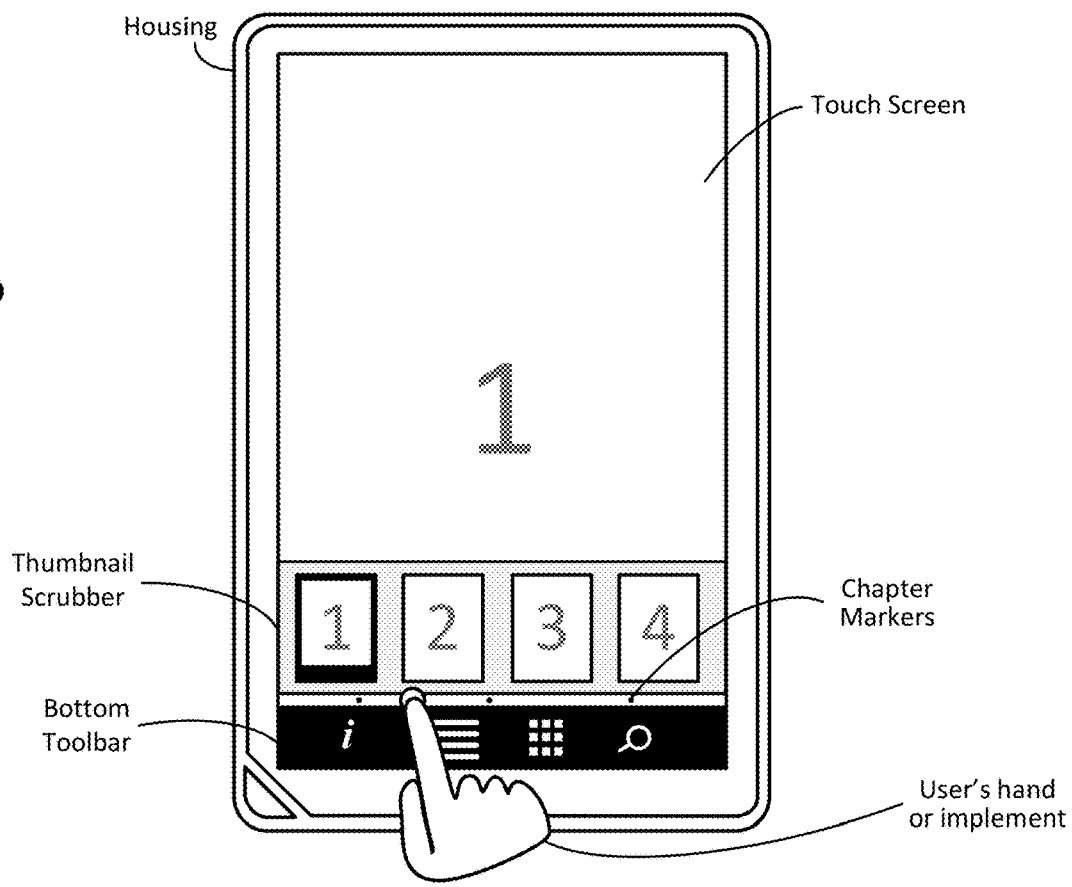

As can be seen in FIG. 3b, pressing on the scrubber knob may invoke the thumbnail scrubber mode and display a thumbnail scrubber bar, in some embodiments. In this particular embodiment, the thumbnail scrubber bar shows thumbnail images of the pages of digital content allowing the user to scroll through and preview the digital content. The top toolbar may disappear, in some embodiments, once the thumbnail scrubber mode is invoked. As can be seen in this example, the main device viewer continues displaying page 1 in the background and users can preview other pages in the thumbnail scrubber without losing track of their original location. In this particular embodiment, the user can view thumbnail images for pages 1-4 in the thumbnail scrubber, and the thumbnail image for page 1 is highlighted, shaded, or otherwise altered in appearance or size in order to indicate to the user that it is associated with the currently displayed content.

Figure 3C:
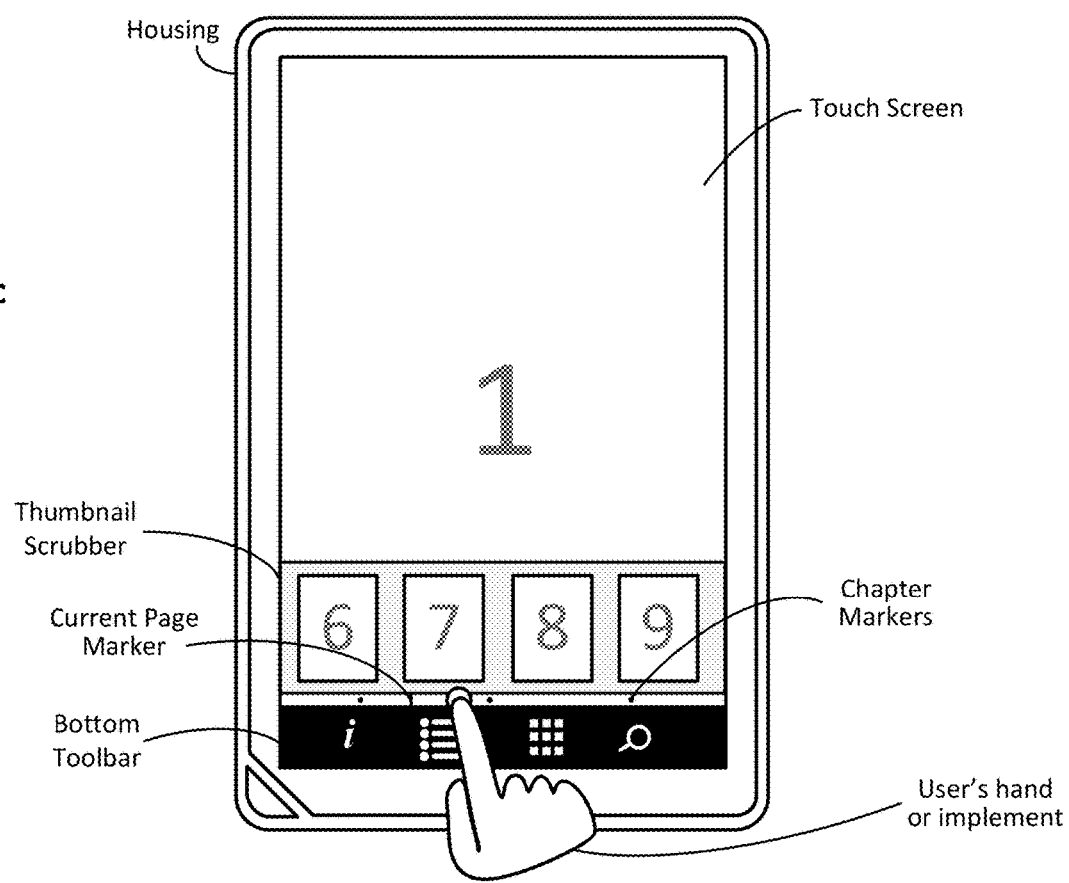
Figure 3D:
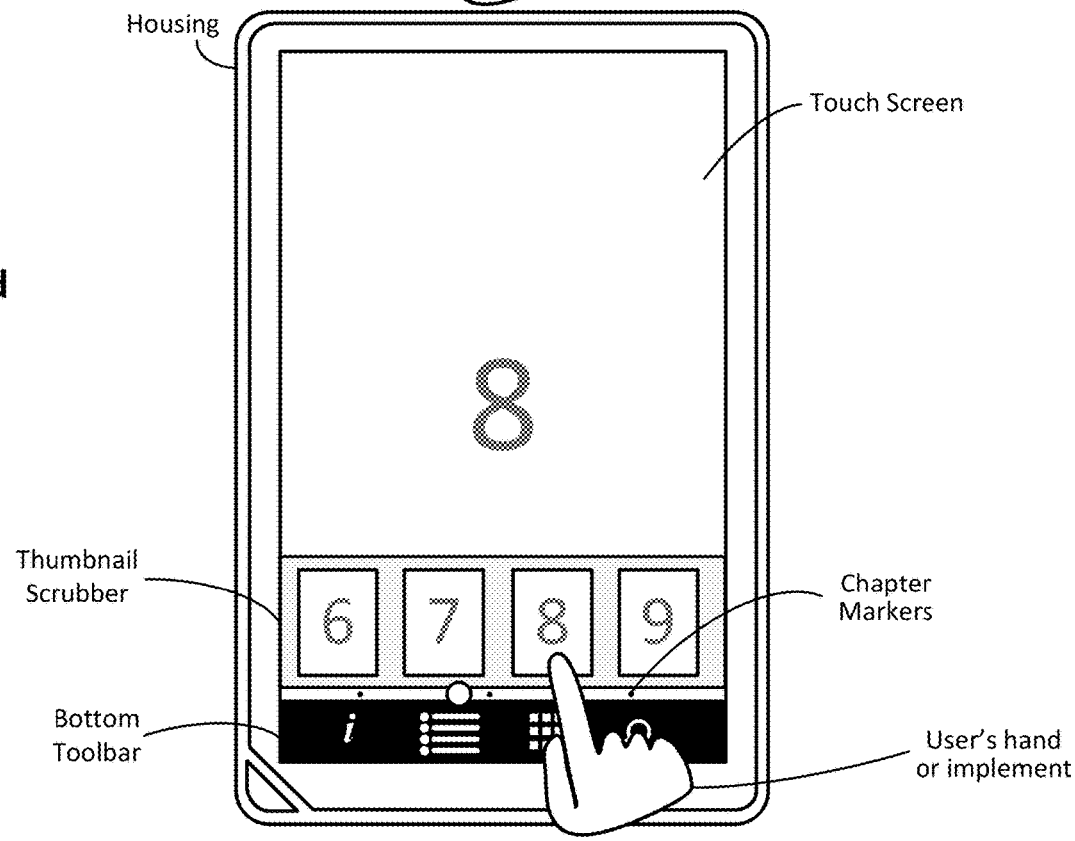

As can be seen in FIG. 3c, when the user drags the scrubber knob to the right, indicating that the user wishes to preview subsequent pages of the eBook, the thumbnail images scroll to the left and are currently displaying thumbnails for pages 6-9. In this particular example, the current page 1 remains in the main viewer and a current page marker is added to the scrubber bar indicating the location of page 1 within the overall eBook. After previewing pages in the thumbnail scrubber, the user may select a thumbnail image in order to access that page of the eBook, as seen in the example shown in FIG. 3d. In this particular embodiment, the user has selected the thumbnail for page 8, thus bringing up page 8 in the main viewer and removing the current page marker from the scrubber bar used to show the location of page 1. In some embodiments, the device may exit the thumbnail scrubber mode automatically upon selecting a page thumbnail, bringing the user to the selected page and no longer showing the bottom toolbar and thumbnail scrubber. In other embodiments, the thumbnail scrubber mode may continue so that the user may view more details about a page without exiting the scrubber. In such an embodiment, the selected page may be displayed in the main viewer behind the thumbnail scrubber and the user may return to viewing only the selected page by tapping an area of the screen away from the toolbars or scrubber, or waiting a specified period of time (e.g., five or six seconds) without contacting the screen.

Figure 4A:
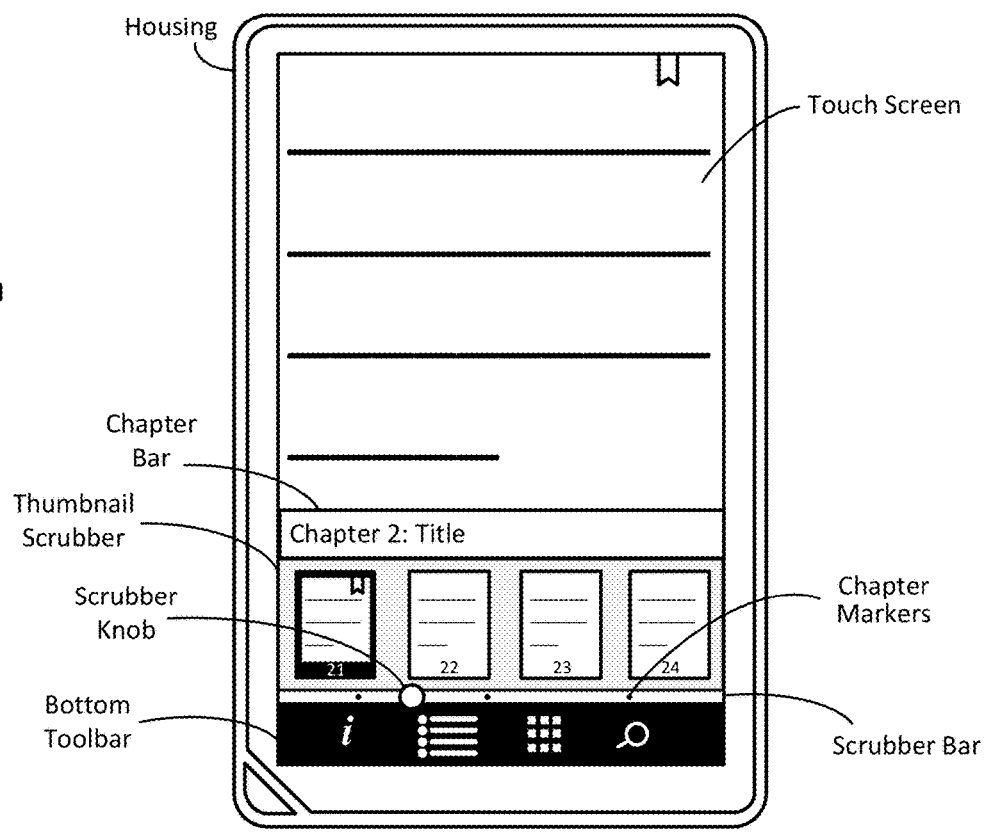
FIGS. 4a-b illustrate an example thumbnail scrubber mode of an electronic touch screen device, in accordance with another embodiment of the present invention.
Figure 4B:
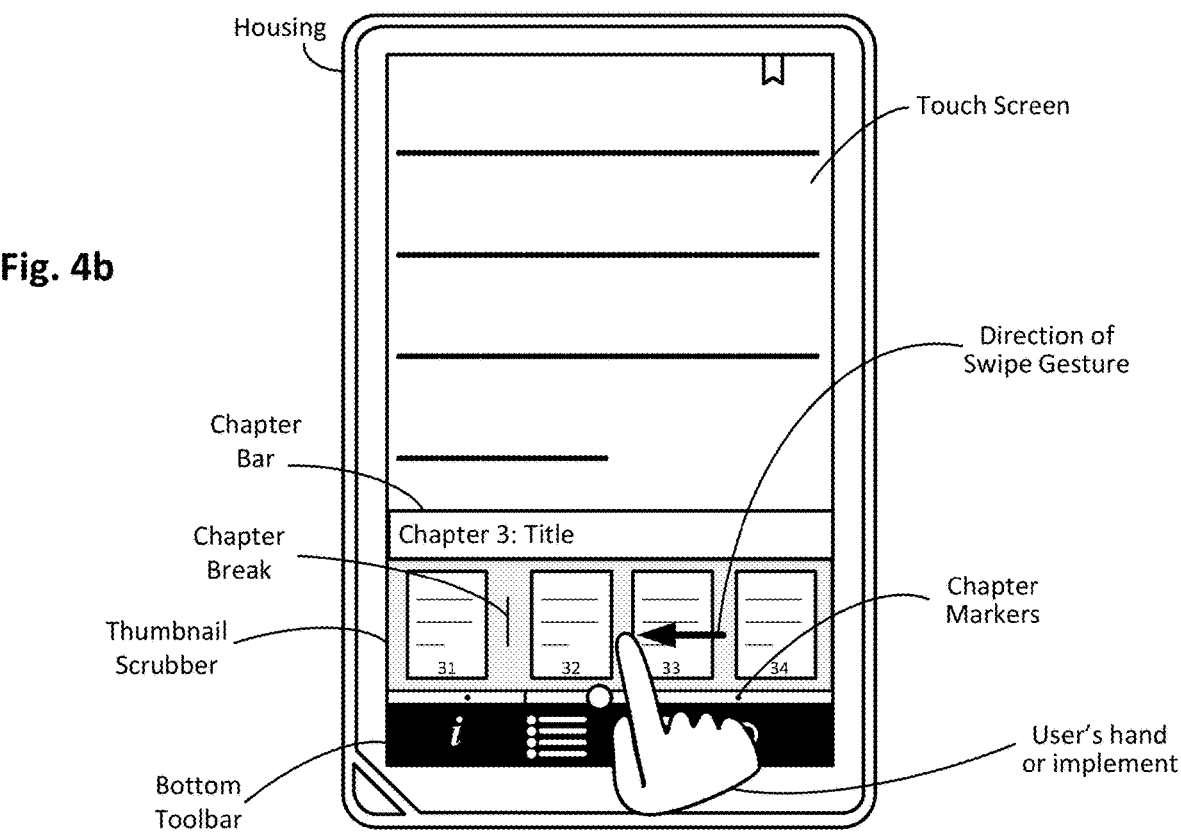

FIGS. 4a-b collectively illustrate an example thumbnail scrubber mode that can be applied to a touch sensitive display of an electronic device, in accordance with another embodiment of the present invention. As can be seen in FIG. 4a, the device housing surrounds the touch screen of the device, and the device is displaying a bookmarked page of text to the user. The user can interact with the touch screen with fingers or any other suitable implement, and in this particular example the user has engaged the thumbnail scrubber mode (e.g., by performing a quick tap gesture on the touch screen, selecting a thumbnail scrubber option from a menu, or some other thumbnail scrubber mode activation gesture). The thumbnail scrubber mode is configured, in this particular embodiment, to display a bottom toolbar, thumbnail scrubber, and chapter bar. In this particular embodiment, the thumbnail scrubber shows thumbnail images of the pages of digital content and allows the user to scroll through and preview the content, while the chapter bar shows the title of the chapter or section currently being previewed by the scrubber. As can be further seen with reference to FIG. 4a, the bottom toolbar contains a number of icons, including an "i" which may display information regarding the content displayed on the device, a table of contents icon, a visual table of contents icon shown as a grid of tiles, a search icon that appears as a magnifying glass, as well as a scrubber bar including a scrubber knob and chapter markers. The chapter markers may display the location of chapter breaks in the eBook, while the scrubber knob may show the user's current progress through the digital content, in some embodiments.

In some embodiments, the user may exit the thumbnail scrubber mode and return to viewing only the page of digital content by tapping an area of the screen away from the toolbars, or waiting a specified period of time (e.g., five or six seconds) without contacting the screen. In this particular embodiment, the current bookmarked page is page 21 of an eBook, and the user can view thumbnail images for pages 21-24 in the thumbnail scrubber. As can be seen, the thumbnail image for page 21 is highlighted, shaded, or otherwise altered in appearance or size in order to indicate to the user that it is associated with the page currently displayed in the main viewer. Furthermore, in this example the thumbnail for page 21 includes a bookmark in the upper right corner indicating that page 21 has been bookmarked.

As can be seen in FIG. 4b, the user may perform a swipe gesture over the thumbnail images in order to scroll through the thumbnails and preview previous or subsequent pages of digital content. In this particular example, the main viewer continues displaying the bookmarked page 21 while the thumbnail scrubber is currently displaying thumbnail images for pages 31-34. As described above, a current page marker may also be added to the scrubber bar indicating the location of page 21 within the overall book. In this example embodiment, there is a chapter break between pages 31 and 32, and this division in the digital content is demonstrated to the user with an increased space and a chapter break line between the thumbnails. Once content associated with chapter 3 of the digital content is being previewed in the thumbnail scrubber, the title of chapter 3 may be displayed in the chapter bar above the thumbnail scrubber, in some embodiments. In one embodiment, a graphic or animation may show the chapter 2 title sliding out of view as the chapter 3 title slides into place in the chapter bar.

Figure 5A:
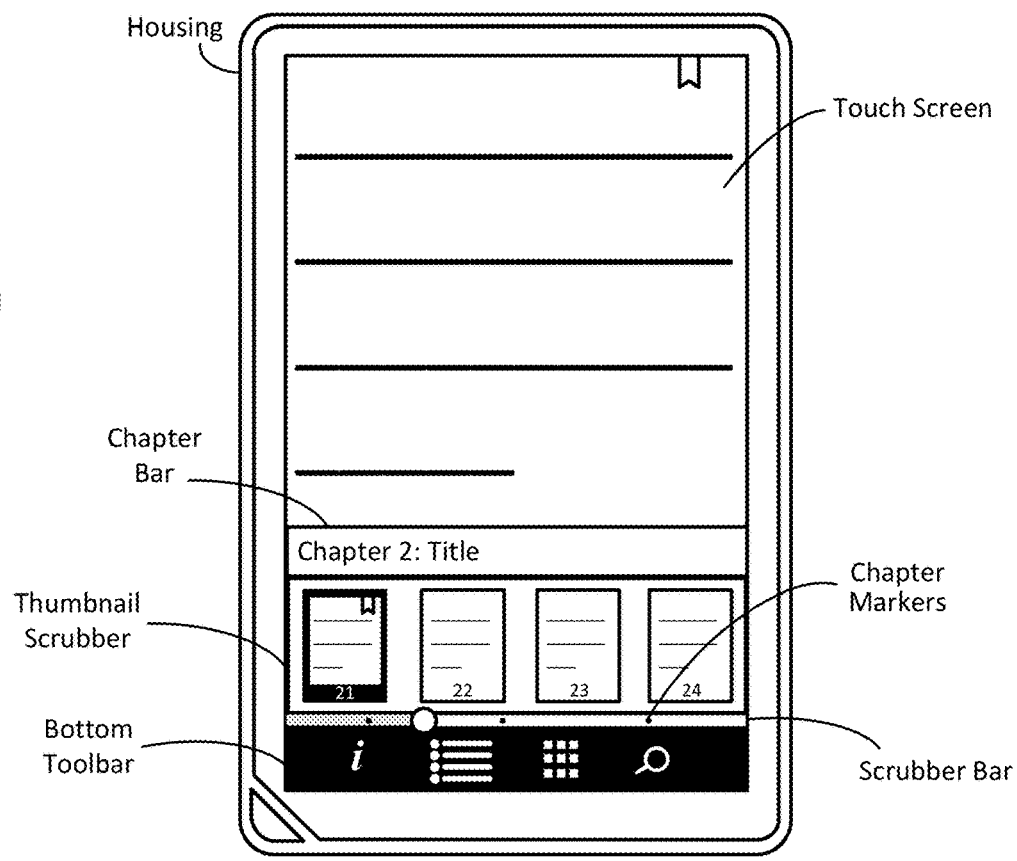
FIGS. 5a-d illustrate an example thumbnail scrubber mode of an electronic touch screen device, in accordance with another embodiment of the present invention.

FIGS. 5a-d collectively illustrate an example thumbnail scrubber mode that can be applied to a touch sensitive display of an electronic device, in accordance with another embodiment of the present invention. As can be seen in FIG. 5a, the device housing surrounds the touch screen of the device, and the device is displaying a bookmarked page of text to the user. The user can interact with the touch screen with fingers or any other suitable implement, and in this particular example the user has engaged the thumbnail scrubber mode (e.g., by performing a quick tap gesture on the touch screen, selecting a thumbnail scrubber option from a menu, or performing some other thumbnail scrubber mode activation gesture). The thumbnail scrubber mode is configured, in this particular embodiment, to display a bottom toolbar, thumbnail scrubber, and chapter bar. In this particular embodiment, the thumbnail scrubber shows thumbnail images of the pages of digital content and allows the user to scroll through and preview the content, while the chapter bar shows the title of the chapter or section currently being previewed by the scrubber. As can be further seen with reference to FIG. 5a, the bottom toolbar contains a number of icons, including an "i" which may display information regarding the content displayed on the device, a table of contents icon, a visual table of contents icon shown as a grid of tiles, a search icon that appears as a magnifying glass, as well as a scrubber bar including a scrubber knob and chapter markers. The chapter markers may display the location of chapter breaks within the digital content being consumed, while the scrubber knob may show the user's current progress through the digital content, in some embodiments. As can be seen, the scrubber bar is shaded to the left of the scrubber bar in order to indicate what content has been already consumed by the user. In this particular embodiment, the current bookmarked page is page 21 of an eBook, and the user can view thumbnail images for pages 21-24 in the thumbnail scrubber. As can be seen, the thumbnail image for page 21 is highlighted, shaded, or otherwise altered in appearance or size in order to indicate to the user that it is associated with the page currently displayed in the main viewer. Furthermore, in this example the thumbnail for page 21 includes a bookmark in the upper right corner indicating that page 21 has been bookmarked.

Figure 5B:
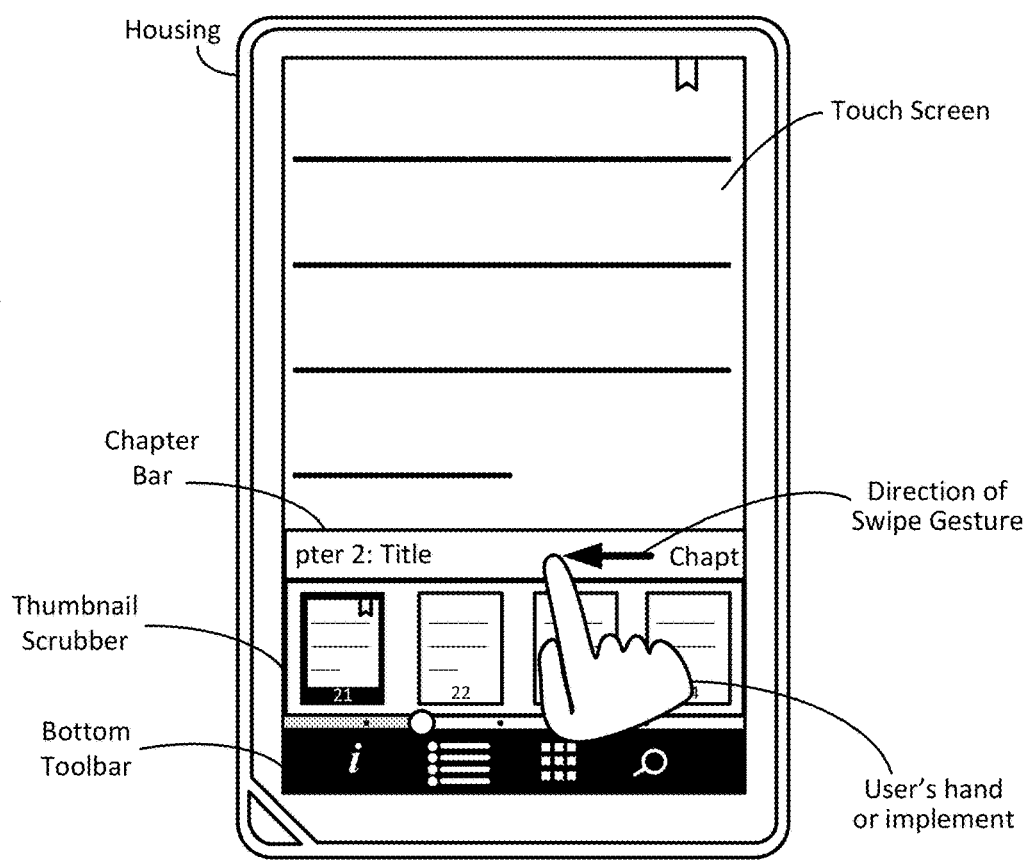
Figure 5C:
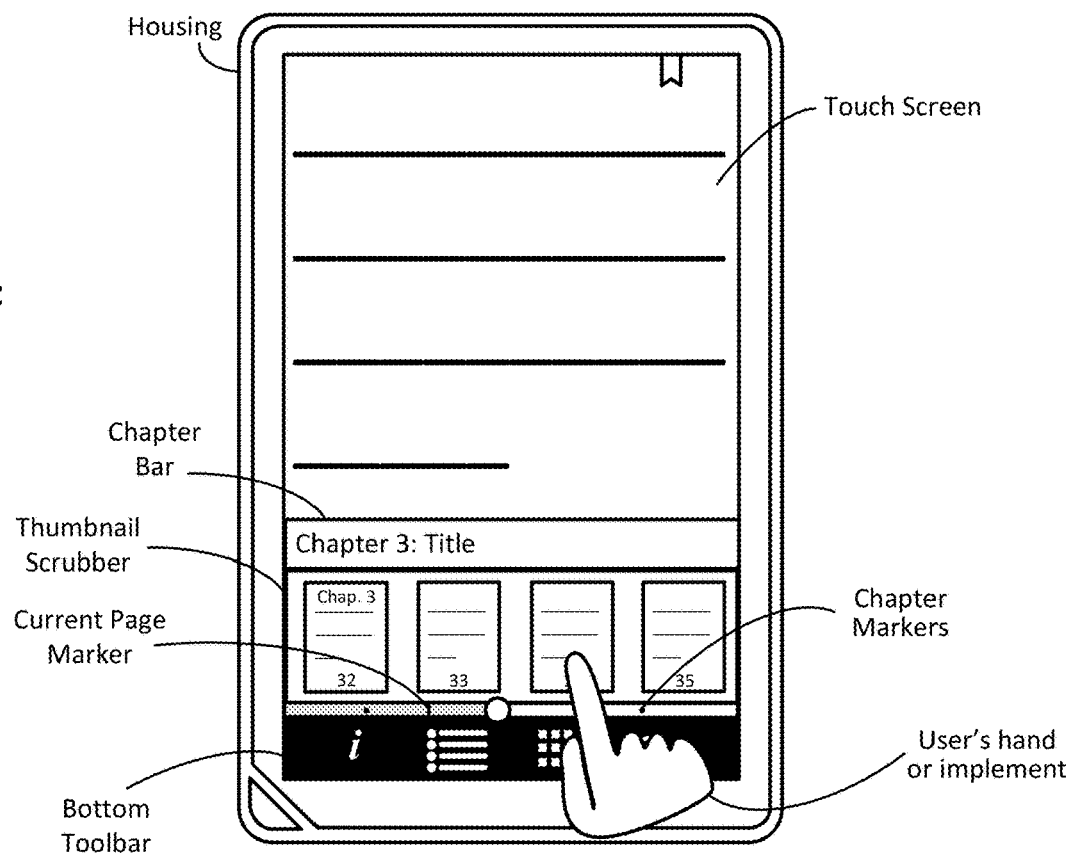
Figure 5D:
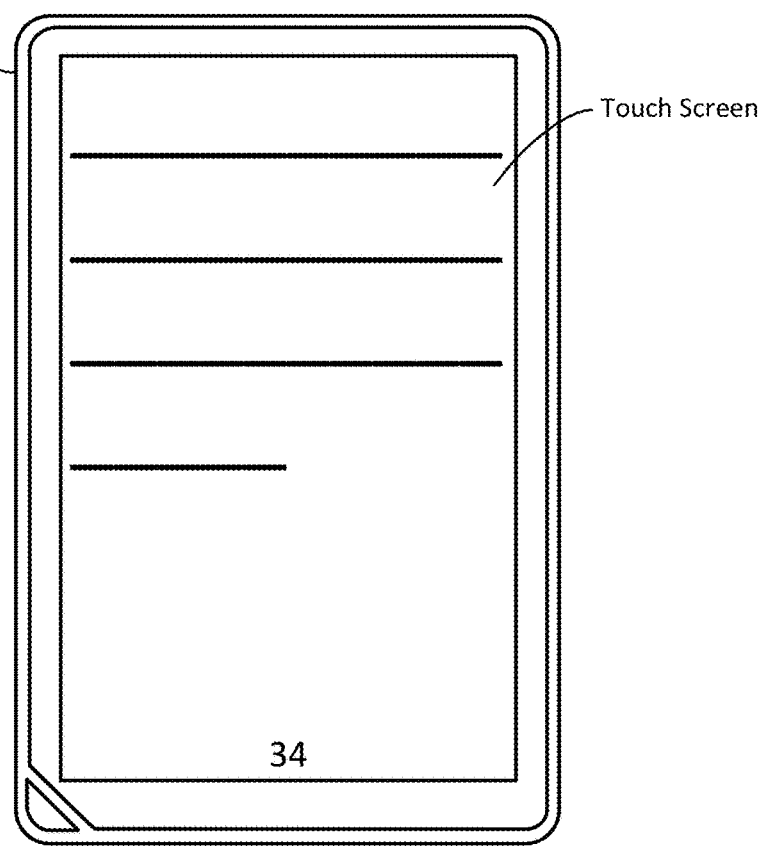

As can be seen in FIG. 5b, the user may perform a swipe gesture over chapter bar in order to scroll through the thumbnails by chapter and preview the first several pages of a previous or subsequent chapter. In this particular example, an animation shows the chapter 2 title sliding out of view into the left margin of the screen, while the chapter 3 title begins to emerge onto the chapter bar from the right margin of the screen as the user is performing a right-to-left swipe gesture. Once the gesture is complete, as displayed in the example of FIG. 5c, the main viewer may continue displaying page 21 while the thumbnail scrubber displays the thumbnail images for pages 32-35, which are the first pages of chapter 3. As described above, a current page marker may also be added to the scrubber bar indicating the location of page 21 within the overall book. In this particular example, the user selects page 34 by tapping on the thumbnail image for that page, thus accessing that page and displaying it in the main viewer, as shown in FIG. 5d. In this example, selecting a thumbnail image automatically exits the thumbnail scrubber mode and hides the toolbars. In other embodiments, tapping the chapter bar while the thumbnails for that chapter are displayed may exit the thumbnail scrubber mode and bring the user to the first page of that chapter.

Figure 6A:
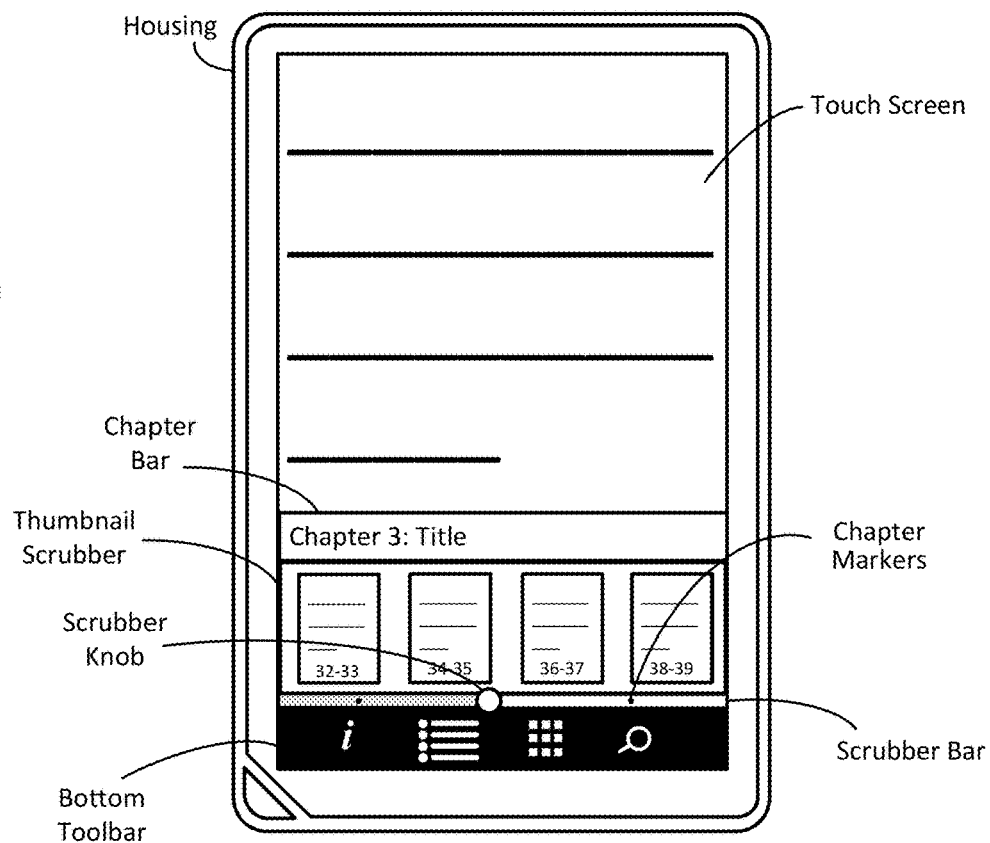
FIGS. 6a-b illustrate different thumbnail options of a thumbnail scrubber mode, in accordance with two embodiments of the present invention.
Figure 6B:
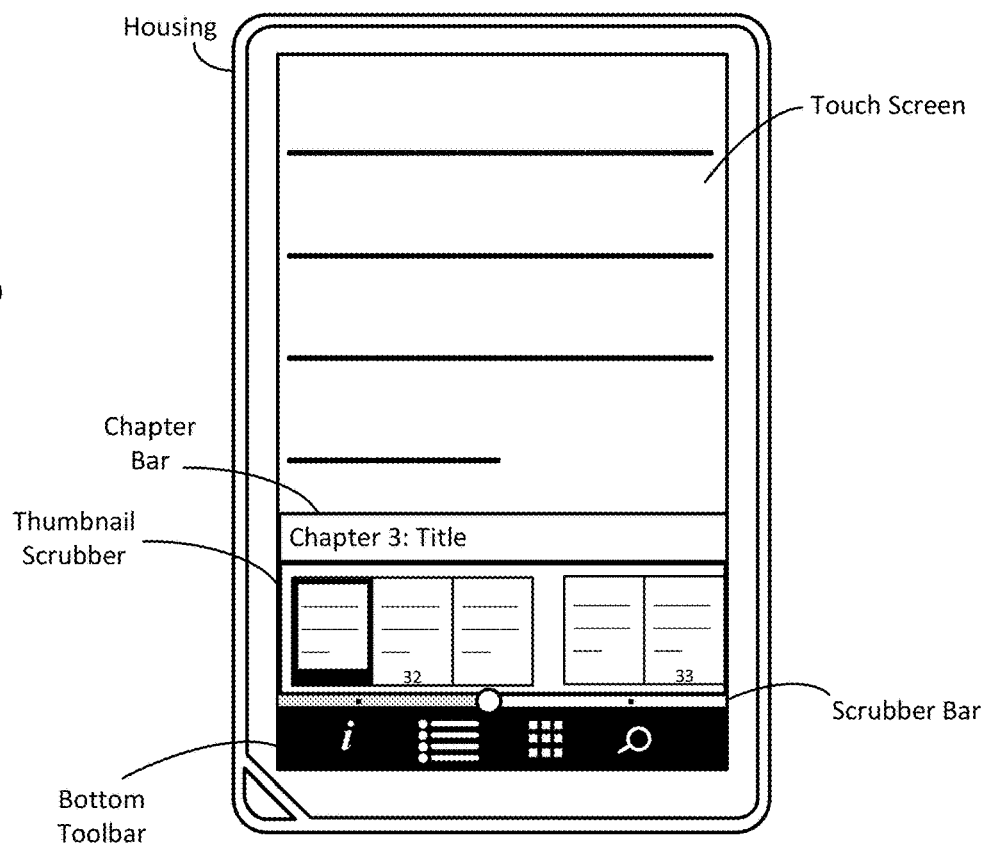

FIGS. 6a-b illustrate different thumbnail options of a thumbnail scrubber mode, in accordance with two embodiments of the present invention. As can be seen in FIG. 6a, the device housing surrounds the touch screen of the device, and the device is displaying a page of text to the user. The user can interact with the touch screen with fingers or any other suitable implement, and in this particular example the user has engaged the thumbnail scrubber mode (e.g., by performing a quick tap gesture on the touch screen, selecting a thumbnail scrubber option from a menu, or performing some other thumbnail scrubber mode activation gesture). The thumbnail scrubber mode is configured, in this particular embodiment, to display a bottom toolbar, thumbnail scrubber, and chapter bar. In this particular embodiment, the thumbnail scrubber shows thumbnail images of the pages of digital content and allows the user to scroll through and preview the content, while the chapter bar shows the title of the chapter or section currently being previewed by the scrubber. As can be further seen with reference to FIG. 6a, the bottom toolbar contains a number of icons, including an "i" which may display information regarding the content displayed on the device, a table of contents icon, a visual table of contents icon shown as a grid of tiles, a search icon that appears as a magnifying glass, as well as a scrubber bar including a scrubber knob and chapter markers. The chapter markers may display the location of chapter breaks within the digital content being consumed, while the scrubber knob may show the user's current progress through the digital content, in some embodiments. As can be seen, the scrubber bar is shaded to the left of the scrubber bar in order to indicate what content has been already consumed by the user. In this particular embodiment, because of the font size of the digital content, the device is currently displaying pages 32-33 of an eBook in the main viewer, and the user can view thumbnail images for pages 32-39 in the thumbnail scrubber.

Depending on the font size and/or zoom level of the digital content being consumed, a single thumbnail can represent multiple pages of content, in some embodiments. In the example shown in FIG. 6a, the font size of the eBook is reduced such that two pages worth of content are displayed on the main viewer of the device, and therefore a single thumbnail image also covers two pages of content. In such an example, each thumbnail in the thumbnail scrubber covers a two-page span and includes two page numbers.

As can be seen in FIG. 6b, the font size may also be increased such that a single page of content may be displayed to the user over multiple frames of the main viewer. In such an example, multiple thumbnails may be used to preview one page of content. As can be seen, the multiple thumbnails associated with a single page of content may be outlined or otherwise grouped together in the thumbnail scrubber and they may share a single page number. In this particular example, thumbnails associated with pages 32 and 33 of the digital content are being previewed in the scrubber, and the main viewer of the device is currently displaying the first one-third of page 32. As can be seen, the thumbnail associated with the content currently displayed on the main viewer may be outlined, highlighted, shaded, or otherwise altered in appearance.

Methodology

Figure 7:
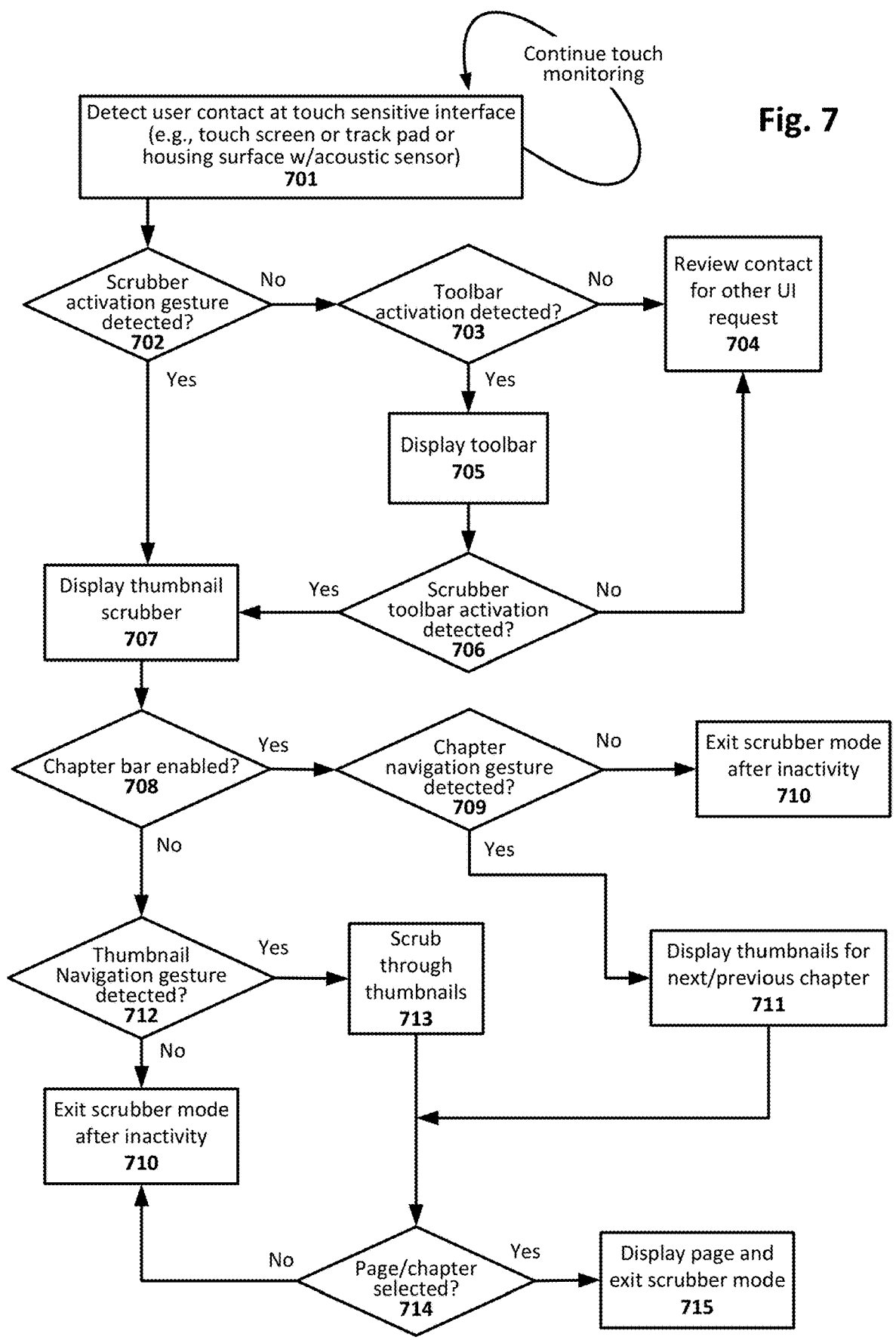
FIG. 7 illustrates a method for providing a thumbnail scrubber mode in an electronic touch screen device, in accordance with an embodiment of the present invention.

FIG. 7 illustrates a method for providing a thumbnail scrubber mode in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the thumbnail scrubber mode can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases contact without moving the contact point, a tap or press or press-and-hold command may be assumed depending on the amount of time the user was continually pressing on the touch sensitive screen. These main detections can be used in various ways to implement UI functionality, including a thumbnail scrubber mode as variously described herein, as will be appreciated in light of this disclosure.

In this example case, the method includes detecting 701 a user contact on the touch sensitive interface. As described above, the contact may be performed in any suitable manner using a stylus, the user's finger, or any other suitable implement, and it may be performed on a touch screen surface, a track pad, acoustic sensor, or other touch sensitive surface. The user contact monitoring is essentially continuous. In other embodiments, the user input may be, for example, a mouse-based signal, or any other user interface input. Once a user contact or other input has been detected, the method may continue with determining 702 whether a thumbnail scrubber mode activation gesture has been detected. If no thumbnail scrubber activation gesture is detected, the method may continue with determining 703 whether a toolbar activation gesture has been detected. If no toolbar activation gesture has been detected, the contact may be reviewed 704 for some other UI request. If a toolbar activation gesture has been detected, however, the method may continue with displaying 705 the toolbar on the electronic device. The method may continue with determining 706 whether a scrubber activation gesture is detected from the toolbar. In some embodiments, the toolbar may include a scrubber bar indicating the user's progress through the digital content, and a scrubber activation gesture may include dragging a scrubber knob located on such a scrubber bar. If no scrubber activation gesture is detected at the toolbar, the method may continue with reviewing 704 the contact for some other UI request. If a scrubber activation gesture has been detected 706 at the toolbar, or if a thumbnail scrubber activation gesture is detected at 702, the method may continue with displaying 707 a thumbnail scrubber on the electronic device. As described above, the thumbnail scrubber includes a number of thumbnail images representing different pages of digital content, in some embodiments.

The method may continue, in some embodiments, with determining 708 whether the thumbnail scrubber mode is configured to display a chapter or section bar along with the thumbnail scrubber. If the chapter bar feature is enabled, the method may continue with determining 709 whether a chapter navigation gesture is detected. As discussed above, a chapter navigation gesture may include a swipe gesture performed over the chapter bar indicating that the user wishes to preview the next or previous chapter, depending on the direction of the swipe gesture. If no chapter navigation gesture is detected, the method may continue with exiting 710 the thumbnail scrubber mode after a period of user inactivity. As discussed above, after a period of time (e.g., five or six seconds) with no user input detected, the thumbnail scrubber mode may exit and return to displaying only the current page of digital content. If a chapter navigation gesture is detected, however, the method may continue with displaying 711 the first several thumbnails associated with the next or previous chapter, depending on the direction of the chapter navigation gesture. If, however, a chapter bar feature is not enabled, the method may continue with determining 712 whether a thumbnail navigation gesture is detected. If no thumbnail navigation gesture is detected, the method may continue with exiting 710 the thumbnail scrubber mode after a period of user inactivity. If a thumbnail navigation gesture is detected, such as a swipe gesture performed over the thumbnail images or a press-and-drag gesture performed over the scrubber knob of a scrubber bar, for example, the method may continue with scrubbing 713 through the thumbnails. The method may continue with determining 714 whether a page or chapter has been selected, either by selecting one of the thumbnail images or selecting the chapter title displayed in the chapter bar. If no selection is detected, the method may continue with exiting 710 the thumbnail scrubber mode after a period of user inactivity. If a selection is detected, the method may continue with displaying the desired page and exiting the thumbnail scrubber mode. In the case of a user selecting a thumbnail image, the desired page is the page of digital content associated with the selected thumbnail, while in the case of a user selecting a chapter, the desired page may be the first page of the selected chapter.

Numerous variations and embodiments will be apparent in light of this disclosure. One example embodiment of the present invention provides a device including a touch screen display for displaying digital content to a user and allowing user input. The device also includes a user interface including a thumbnail scrubber mode configured to display a current page of digital content, and a thumbnail scrubber including a plurality of thumbnail images representing pages of the digital content, and scroll through the thumbnail images in response to a scrolling gesture while continuing to display the current page of content. In some cases, the thumbnail scrubber mode is further configured to display the thumbnail scrubber in response to a thumbnail scrubber activation gesture performed over the current page of digital content. In some cases, a single thumbnail image represents multiple pages worth of digital content. In some cases, the thumbnail scrubber mode is further configured to display a toolbar including a scrubber bar, and to display the thumbnail scrubber in response to a user interaction with the scrubber bar. In some cases, the scrubber bar includes a scrubber knob indicating the location of the thumbnail images being previewed within the digital content, and wherein the scrolling gesture includes dragging the scrubber knob along the scrubber bar. In some cases, the scrubber bar includes a current page marker indicating the location of the current page. In some cases, the thumbnail scrubber mode is further configured to display a section bar indicating a title of a section of digital content being previewed in the thumbnail scrubber, and wherein the scrolling gesture comprises a swipe gesture performed over the section bar. In some such cases, in response to a selection of a section title, the thumbnail scrubber mode is further configured to display a first page of digital content associated with the selected section title. In some cases, the scrolling gesture includes a swipe gesture performed over the plurality of thumbnail images. In some cases, the thumbnail scrubber further includes a section break indicator between thumbnail images representing pages adjacent to a section break in the digital content. In some cases, in response to a selection of a thumbnail image, the thumbnail scrubber mode is further configured to display a page of digital content associated with the selected thumbnail image. In some cases, the thumbnail scrubber mode is further configured to exit out of the thumbnail scrubber mode in response to a period of time wherein no user input has been detected.

Another example embodiment of the present invention provides a mobile computing system including a processor and a touch screen display for displaying content to a user and allowing user input. The system also includes a user interface executable on the processor and including a thumbnail scrubber mode configured to display a current page of digital content and a thumbnail scrubber including a plurality of thumbnail images representing pages of the digital content, and scroll through the thumbnail images in response to a scrolling gesture while continuing to display the current page of content. In some cases, the thumbnail scrubber mode is also configured to display a toolbar including a scrubber bar having a scrubber knob, and to display the thumbnail scrubber in response to a user dragging the scrubber knob along the scrubber bar. In some cases, the scrubber bar includes a current page marker indicating the location of the current page. In some cases, the thumbnail scrubber mode is also configured to display a section bar indicating a title of a section of digital content being previewed in the thumbnail scrubber, and wherein the scrolling gesture includes a swipe gesture performed over the section bar.

Another example embodiment of the present invention provides a computer program product including a plurality of instructions non-transiently encoded thereon and executable by one or more processors to carry out a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to display on an electronic device a current page of digital content; display on the electronic device, in response to a thumbnail scrubber activation gesture, a thumbnail scrubber comprising a plurality of thumbnail images representing pages of the digital content; and scroll, in response to a scrolling gesture, through previous or subsequent thumbnail images depending upon the orientation of the scrolling gesture, wherein the current page of digital content continues being displayed on the electronic device. In some cases, the process also includes displaying on the electronic device a scrubber bar including a scrubber knob, and wherein the scrolling gesture includes a dragging gesture performed over the scrubber knob. In some cases, the process also includes displaying on the electronic device a section bar indicating a title of a section of digital content being previewed in the thumbnail scrubber, and wherein the scrolling gesture includes a swipe gesture performed over the section bar. In some cases, the thumbnail scrubber activation gesture and/or the scrolling gesture may be user configurable.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
 a memory to store instructions;
 a display screen to display digital content that includes a plurality of chapters, each chapter including one or more corresponding pages; and
 a processor to execute the instructions, to invoke a thumbnail mode,
 wherein, while the thumbnail mode is invoked, the thumbnail mode is configured to cause simultaneous display on the display screen of (i) a current page of the digital content on a first region of the display screen, (ii) a scrubber bar on a second region of the display screen, (iii) a plurality of thumbnail images on a third region of the display screen, each thumbnail image representing a corresponding page of the digital content, and chapter information on a fourth region of the display screen, the chapter information identifying a chapter title of a chapter of the digital content to which thumbnail images currently displayed in the third region belong,
 wherein, while the thumbnail mode is invoked, and in response to a scroll input received on the fourth region of the display screen, the thumbnail mode is configured to change the display of a first chapter title in the fourth region to a second chapter title and update the plurality of thumbnail images in the third region to display pages corresponding to the second chapter title, while the display screen continues to display the current page in the first region,
 wherein the scrubber bar displayed on the second region of the display screen includes (a) one or more chapter markers that indicate one or more locations of one or more corresponding chapter breaks within the digital content, (b) a draggable knob that indicates a location of the currently displayed thumbnail images within the digital content, and (c) a current page marker that indicates a location of the current page within the digital content.

2. The device of claim 1, wherein while the thumbnail mode is invoked, and in response to a scroll gesture received in the third region, the thumbnail mode is configured to cause scrolling of the thumbnail images within the third region in a sequential fashion, while the display screen continues to display the current page, such that (i) a scroll gesture in a first direction scrolls the thumbnail images representing pages of the digital content that occur prior to the current page and (ii) a scroll gesture in a second direction opposite the first direction scrolls the thumbnail images representing pages of the digital content that occur subsequent to the current page.

3. The device of claim 1, wherein while the thumbnail mode is invoked, and in response to a scroll input, the thumbnail mode is configured to cause scrolling of the thumbnail images within the third region, while the display screen continues to display the current page,
 wherein when the scrolling results in simultaneous display of first one or more thumbnail images of a first chapter and second one or more thumbnail images of a second chapter within the third region, the chapter information on the fourth region is to display at least a part of a chapter title of the first chapter and at least a part of a chapter title of the second chapter.

4. The device of claim 3, wherein when the scrolling results in simultaneous display of thumbnail images of the first chapter and the second chapter within the third region, the chapter information on the fourth region is to display:
 a part of, but not an entirety of, the chapter title of the first chapter; and
 a part of, but not an entirety of, the chapter title of the second chapter.

5. The device of claim 1, wherein while the thumbnail mode is invoked, and in response to a scroll gesture, the thumbnail mode is configured to cause scrolling of the thumbnail images within the third region, while the display screen continues to display the current page, wherein the scroll gesture comprises one or more of (i) a drag gesture performed on the draggable knob along the scrubber bar, (ii)

a swipe gesture performed on the third region, and/or (iii) a swipe gesture performed over the fourth region.

6. The device of claim 1, wherein the third region displays a chapter break indicator between (i) first one or more of the thumbnail images representing pages belonging to a first chapter in the digital content and (ii) second one or more of the thumbnail images representing pages belonging to a second chapter in the digital content, and wherein the first one or more thumbnail images, the chapter break indicator, and the second one or more thumbnail images are arranged in a linear manner.

7. The device of claim 1, wherein the current page marker is not initially displayed in the scrubber bar, when the thumbnail images currently being displayed includes the current page, and wherein the current page marker is added to the bar, in response to the thumbnail images currently being displayed not including the current page.

8. The device of claim 1, wherein the processor is to invoke the thumbnail mode, in response to a thumbnail activation gesture performed over the current page of digital content.

9. The device of claim 1, wherein the processor is to exit the thumbnail mode, in response to a failure to detect any user input for at least a threshold period of time.

10. The device of claim 1, wherein a single thumbnail image represents multiple pages of digital content.

11. The device of claim 1, wherein, in response to a selection of a thumbnail image, the thumbnail mode is configured to cause display of a corresponding page of the digital content associated with the selected thumbnail image.

12. The device of claim 1, wherein the current page marker is distinct from the draggable knob and is not visible when the draggable knob overlaps with the current page marker.

13. The device of claim 1, wherein while the thumbnail mode is invoked, the thumbnail mode is configured to cause (i) display of a toolbar that includes the scrubber bar, and (ii) display the third region in response to a user dragging the knob along the bar.

14. The device of claim 1, wherein the plurality of thumbnail images includes a set of two or more thumbnail images associated with a single page of the digital content, such that each of the two or more thumbnail images is associated with a different portion of the single page of the digital content.

15. A method for providing a user interface for navigating paginated content, the method comprising:
simultaneously displaying (i) on a first region of a display screen, a current page of digital content that includes a plurality of chapters, (ii) on a second region of the display screen, a scrubber bar, (iii) on a third region of the display screen, a plurality of thumbnail images, and (iv) on a fourth region of the display screen, chapter information identifying a chapter title of a chapter of the digital content to which thumbnail images currently displayed in the third region belong,
wherein each chapter of the digital content includes one or more corresponding pages,
wherein each thumbnail image represents a corresponding page of the digital content,
wherein the scrubber bar displayed on the on the second region of the display screen includes (a) one or more chapter markers that indicate one or more locations of one or more corresponding chapter breaks within the digital content, b) a knob that is draggable along the scrubber bar to cause scrolling of the thumbnail images, and (c) a current page marker that is distinct from the draggable knob and indicates a location of the current page within the digital content;
in response to a scroll input received on the fourth region of the display screen, changing the display of a first chapter title in the fourth region to a second chapter title and updating the plurality of thumbnail images in the third region to display pages corresponding to the second chapter title, while the display screen continues to display the current page in the first region; and
scrolling through the thumbnail images in response to a scroll gesture, while continuing to display the current page.

16. The method of claim 15, wherein the third region displaying the plurality of thumbnail images is displayed between the first region displaying the current page and the second region displaying the scrubber bar.

17. The method of claim 15, further comprising:
displaying, within the fourth region, at least a part of a chapter title of a first chapter and at least a part of a chapter title of a second chapter, in response to simultaneously displaying thumbnail images of a first chapter and a second chapter within the third region.

18. A computer program product comprising one or more non-transitory machine-readable mediums including a plurality of instructions encoded thereon that when executed by one or more processors cause a process to be carried out, the process comprising:
causing simultaneous display of (i) on a first region of a display screen, a current page of digital content that includes a plurality of chapters, (ii) on a second region of the display screen, a scrubber bar, (iii) on a third region of the display screen a plurality of thumbnail images, and (iv) on a fourth region of the display screen, a chapter title of a chapter of the digital content to which thumbnail images currently displayed in the third region belong;
wherein each chapter of the digital content includes one or more corresponding pages, wherein each thumbnail image represents a corresponding page of the digital content, and
wherein the scrubber bar includes (a) one or more chapter markers that indicate one or more locations of one or more corresponding chapter breaks within the digital content, and (b) a draggable knob that indicates a location of the currently displayed thumbnail images within the digital content relative to the one or more locations of the one or more corresponding chapter breaks;
in response to a scroll input received on the fourth region of the display screen, changing the display of a first chapter title in the fourth region to a second chapter title and updating the plurality of thumbnail images in the third region to display pages corresponding to the second chapter title, while the display screen continues to display the current page in the first region; and
scrolling through the thumbnail images in response to a scroll gesture, while continuing to display the current page.

19. The computer program product of claim 18, the process further comprising causing simultaneous display of, within the third region, a chapter break indicator between (i) first one or more of the thumbnail images representing pages belonging to a first chapter in the digital content and (ii) second one or more of the thumbnail images representing pages belonging to a second chapter in the digital content, wherein the first one or more thumbnail images, the chapter break indicator, and the second one or more thumbnail images are arranged in a same line.

20. The computer program product of claim 18, wherein when the scrolling results in simultaneous display of first one or more thumbnail images of a first chapter and second one or more thumbnail images of a second chapter within the third region, the fourth region is to display at least a part of a chapter title of the first chapter and at least a part of a chapter title of the second chapter.

\* \* \* \* \*